March 10, 1925. 1,529,042
I. O. TEASLEY ET AL
PLOW
Filed July 25, 1923 2 Sheets-Sheet 1

Inventors
I. O. Teasley
R. B. Martin
B. Davis Davis
By
Attorneys

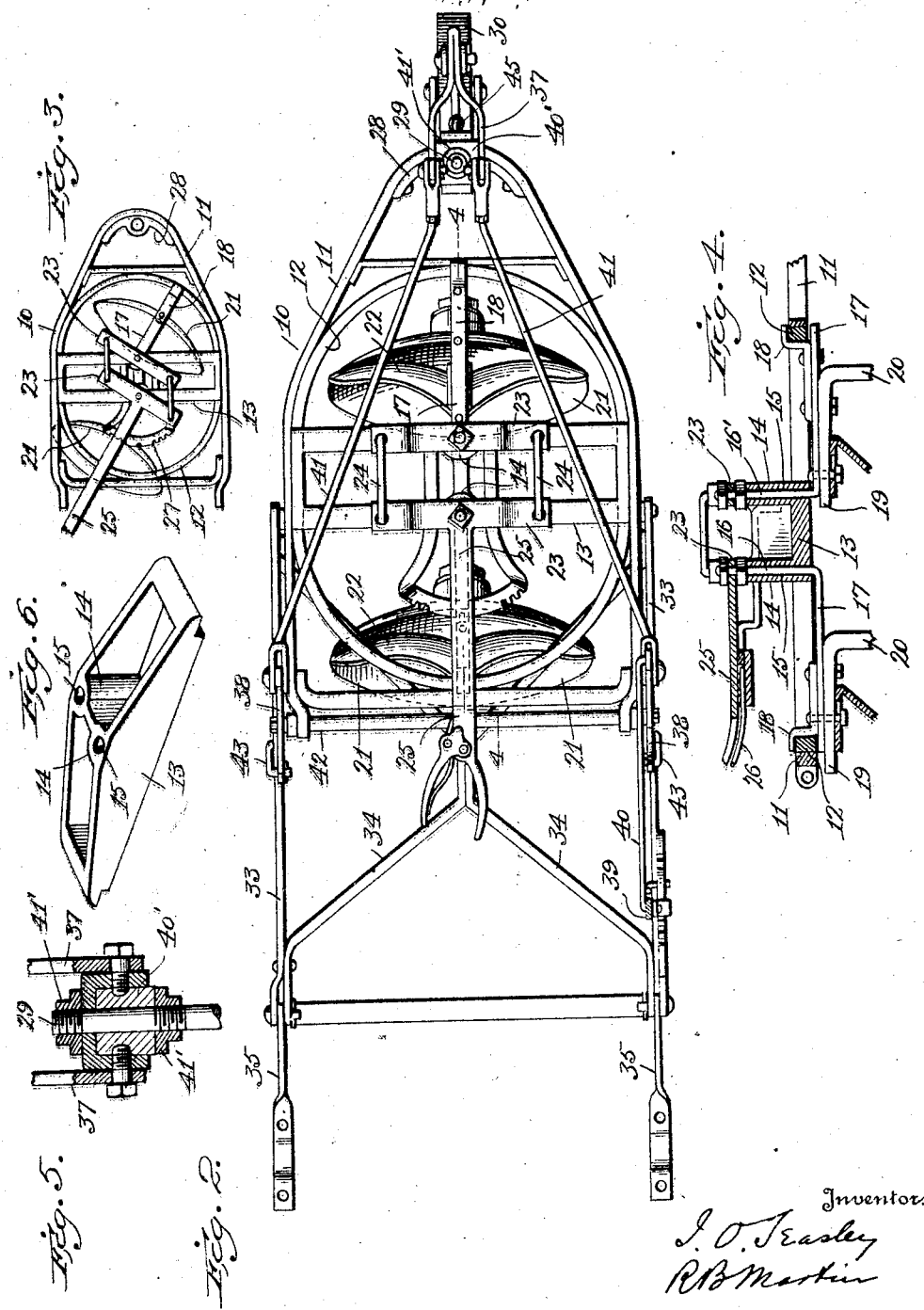

Patented Mar. 10, 1925.

1,529,042

UNITED STATES PATENT OFFICE.

ISHAM O. TEASLEY AND ROLLA B. MARTIN, OF ALPHORETTA, GEORGIA.

PLOW.

Application filed July 25, 1923. Serial No. 653,717.

*To all whom it may concern:*

Be it known that we, ISHAM O. TEASLEY and ROLLA B. MARTIN, citizens of the United States of America, and residents, respectively, of Alphoretta, Georgia, Milton County, have invented certain new and useful Improvements in Plows, of which the following is a full and clear specification.

This invention relates to improvements in reversible disk plows and has for its object to provide a plow of this character having means thereon for adjusting the position of the disks to throw the soil to either side of the plow as desired and other means for attaching it to a suitable draft means such as a motor-driven or animal-drawn vehicle, said other means being constructed to permit the plow to be backed when necessary.

Another object is to provide means for adjusting the disks vertically to engage the ground more or less or be elevated free therefrom for transportation purposes, and at the same time maintain an equal adjustment to the supporting-frame so that the several plows will be lifted or depressed an equal distance simultaneously.

These and other objects hereinafter set forth are attained by the means illustrated in the accompanying drawings, in which—

Fig. 2 is a plan view of the plow and its draft-frame;

Fig. 3 is a detail plan view of the plow-supporting-frame showing the plows adjusted to a position to throw the furrows to the right;

Fig. 4 is a detail vertical sectional view on the line 4—4 of Fig. 2;

Fig. 5 is a detail sectional view through the head block of the furrow-wheel shank;

Fig. 6 is a detail view of the transverse support on the supporting-frame.

Figure 1:
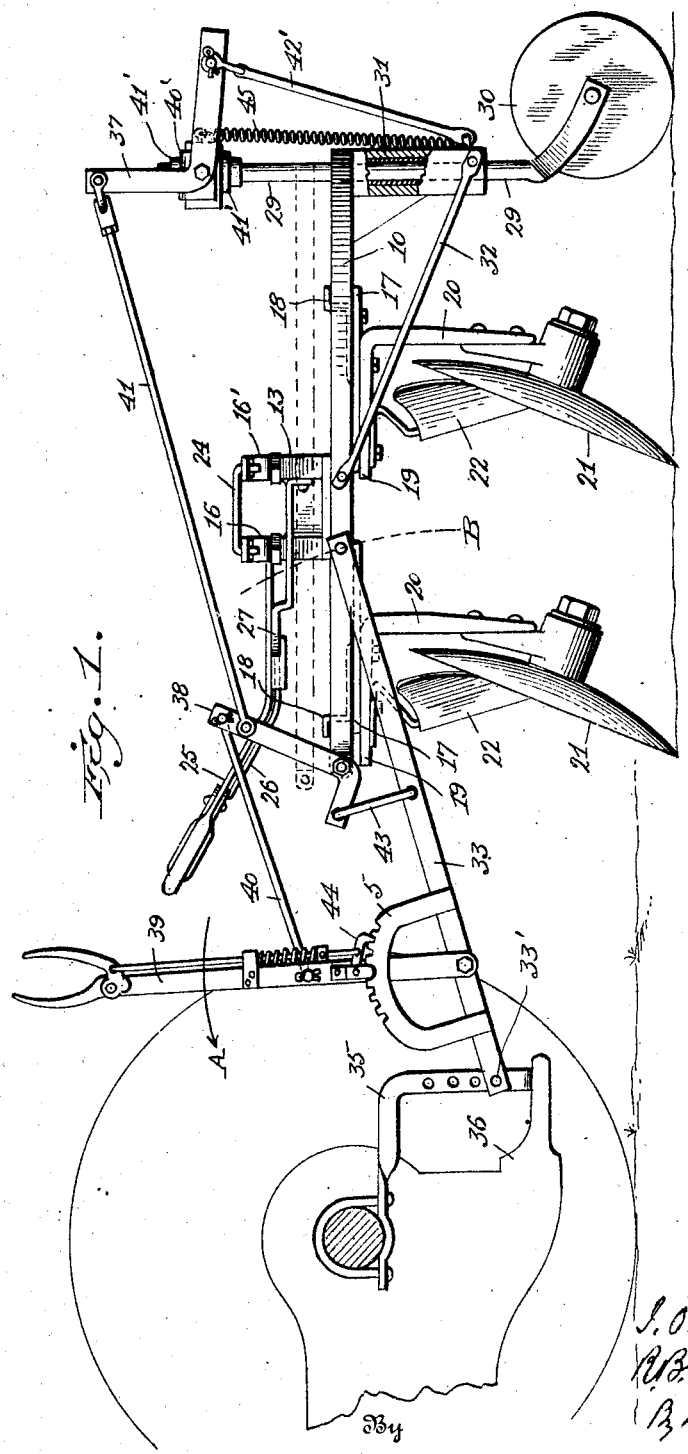
Fig. 1 is a side elevation of the improved plow showing it attached to the rear end of a tractor.

Referring to the drawings, 10 designates the supporting-frame which is preferably formed of strap metal and consists of an outer frame 11 and an inner frame 12 suitably connected together by bolts or otherwise, said inner frame being approximately circular in shape to serve as tracks for the plow-slides hereinafter described.

Mounted across and approximately centrally of the supporting-frame 10 is a transverse support 13 preferably formed of cast metal and secured rigidly in position in any suitable manner. This plow-support is provided with spaced bosses 14 through which are vertically formed suitable openings 15 adapted to receive the pivot-shanks 16 and 16' projecting upwardly from the inner ends of a pair of radially-arranged plow-supporting-arms 17 extending in opposite directions from each other from their shanks 16. The outer or free ends of these arms 17 preferably closely underlie the inner frame 12 and have secured to their upper sides the guide-lugs 18 which are adapted to slide upon the upper surface of the inner frame 12 and thus support and guide arms 17 in their radial adjustments.

To the under side of the arms 17 are secured the horizontal extensions 19 of the plow-shanks 20, to the lower of which are journaled in the usual manner the disk cultivators 21, suitable scrapers 22 being mounted on the plow-shanks 20 in position to clean the concave side of each disk.

Secured centrally of their length to the upper ends of the pivot shanks 16 and 16' and above the transverse support 13 are the transverse arms 23 which are held in parallel relation to each other by the links 24 connecting their respective ends. One arm 23 has a forwardly-extending handle 25 having a suitable latch-member 26 adapted to engage a toothed segment 27 to retain the handle and plow disks in their adjusted positions. Thus it will be observed that when the handle 25 is shifted to one side or the other, the forward plow disk beneath the handle will move in the same direction with the handle, and the rear plow disk will move in an opposite direction, as the pivotal centers of the disks are to the rear and front sides of the front and rear plow disks, respectively, and consequently maintain the disks facing in like directions at all times.

Outer frame 11 is preferably tapered at its rear side and has secured centrally therein a pivot bearing 28 in which is mounted the elongated pivot shank 29 of a caster furrow wheel 30, said pivot shank 29 also extending through an elongated bearing-block 31 secured to the under side of the supporting-frame 10 and preferably braced in position by rods 32 extending from the lower end of the block 31 to a point on the supporting-frame 10 approximately midway its length. From the above, it will be seen that the supporting-frame 10 and the furrow-wheel 30 are vertically adjustable relative to each other, the supporting-frame being mounted to slide freely on the shank 29 of the furrow-wheel.

A draft-frame is employed to connect the plow to the tractor, which embodies the side-bars 33 which are retained in spaced relation with each other by suitable braces 34, said side-bars 33 being pivoted at their rear ends to the sides of the supporting-frame 10 approximately midway its length. Each side-bar is also pivoted at its front end at 33' to a suitable clevis 35 which is rigidly secured to the rear end of the tractor frames 36. Each clevis is preferably constructed to engage the axle of the tractor wheels outside of the frame of the tractor or between the frame and adjacent wheel. This described construction of the draft connection will permit a vertical movement between the plow and tractor, but will also prevent any relative lateral movement, which will permit the plow to be backed without disconnecting it from the tractor; the caster furrow-wheel 30 will cooperate to permit the backing movement, as it will turn on its pivoted shank to trailing position during the rearward action.

The means for adjusting the supporting-frame 10 relative to the furrow-wheel 30 embodies a rear angle-lever 37, front angle-levers 38, 38', a height-adjusting handle 39, and rod connections 40 and 41 connecting said handle 39 to lever 38 and lever 37 to lever 38, respectively. Lever 37 is pivoted at the intersection of its vertical and horizontal arms (with its horizontal arm extending rearwardly from its pivot) to a head-block 40' pivotally mounted on the upper end of shank 29 of the furrow-wheel 30, and said head-block 40' is prevented from sliding on the shank 29 by suitable nuts 41' arranged on each side of the head-block 40'. The free end of the horizontal arm of this lever 37 is connected to the lower end of the bearing-block 31 by a rod 42 which is pivotally connected at its ends to both bearing-block 31 and lever 37.

Angle-levers 38, 38' are pivoted intermediate their length adjacent the front corners of the supporting-frame 10, preferably on the ends of a rod 42' extending transversely across the front end of the supporting-frame. The horizontal arms of these angle-levers 38, 38' extend forwardly from the supporting-frame 10 and the free ends are connected by pivoted links 43 to the side-bars 33 of the draft-frame.

Height-adjusting handle 39 extends vertically and is pivoted to one of the side-bars 33 preferably adjacent to the front end thereof, and is provided with a suitable spring-held latch 44 which is adapted to engage the teeth of a segment 45 to lock the handle in its adjusted positions, said segment being rigidly secured to the same side-bar 33 to which the handle is pivoted.

Connecting the head-block 40' and bearing-block 31 is a spring 45 having a tendency to lift the supporting-frame toward the head-block 40'.

In operation, after the disks are set to throw the soil in the desired direction, the plow is drawn across the field. At the end of the row, the tractor and plow can be turned and be positioned for the return cut in any easy manner, as the draft connections described will permit the tractor to back the plow without detachment from the tractor. Then the disks are adjusted by the handle 25 to throw the furrow upon the last-turned furrow, though the plow will travel in an opposite direction, thus permitting the operator to plow up and down on one side of the field.

When it is desired to transport the plow from place to place without cutting, the elevating-lever 39 is operated to cause the supporting-frame 10 and the plows to be raised clear of the ground. When the handle 39 is pulled in the direction of the arrow A, Fig. 1, it will operate the rear angle-lever 37 and cause the rod 42 to pull upwardly on the rear end of the frame. Owing to the draft-bars 33 being connected to the tractor at their forward ends, the supporting-frame 10 in raising is obliged to move slightly forward on the radius of the dotted line B, and at the same time the front angle-levers 38 are pushing on the links 43, which, owing to the resistance offered by the bars 33, forces or lifts the front end of the supporting-frame 10 upwardly equally with the rear end (to the dotted-line position shown in Fig. 1), thus lifting the entire supporting-frame and the plows supported therefrom simultaneously and equally.

It will be understood that the operating handles 25 and 39 can be, if desired, within easy reach of the operator seated on the tractor.

What we claim is:

1. In combination with a tractor, a plow supporting-frame, a caster wheel mounted at the rear end thereof, said caster wheel and supporting-frame being connected in a manner to permit relative vertical adjustment, a rigid pivoted draft-frame connecting said supporting-frame and tractor, and means for lifting the rear end of the supporting-frame embodying an operating-handle on the draft-frame, a rear angle-lever pivoted on the caster wheel shank and rod connections between said rear angle-lever and said operating-handle and also from the angle-lever to the supporting-frame.

2. In combination with a tractor, a plow supporting-frame, a caster wheel mounted at the rear end thereof, said caster wheel and supporting-frame being connected in a manner to permit relative vertical adjustment, a rigid pivoted draft-frame connecting the supporting-frame and tractor, adjusting means at the rear and front ends of the supporting-frame for vertically adjusting both ends thereof simultaneously in the same direction, and a handle for operating said adjusting means.

3. In combination with a tractor, a plow supporting-frame, a caster wheel mounted at the rear end thereof, a rigid pivoted draft-frame connecting the supporting-frame and tractor, a rear angle-lever pivoted to the upper end of the shank of the caster wheel and connected to the supporting-frame for vertically adjusting the rear end of the supporting-frame, front angle-levers pivoted to the front end of the supporting-frame and having link connections with the draft-frame for vertically adjusting the front end of the supporting-frame, rods connecting the front and rear angle-levers, and an operating-handle for simultaneously operating both the front and rear angle-levers.

4. In combination with a tractor, a plow supporting-frame, a caster wheel mounted at the rear end thereof, a rigid pivoted draft-frame connecting the supporting-frame and tractor, a rear angle-lever pivoted to the upper end of the shank of the caster wheel and connected to the supporting-frame for vertically adjusting the rear end of the supporting-frame, front angle-levers pivoted to the front end of the supporting frame and having link connections with the draft-frame for vertically adjusting the front end of the supporting frame, rods connecting the front and rear angle-levers, and an operating-handle for simultaneously operating both the front and rear angle-levers, said draft-frame being pivotally connected to the outer sides of the supporting-frame at a point intermediate its length, and said front angle-levers being connected to the draft-frame side-bars between its pivoted ends.

In testimony whereof we hereunto affix our signatures this 10 day of July, 1923.

ISHAM O. TEASLEY.
ROLLA B. MARTIN.